(12) United States Patent
Davis et al.

(10) Patent No.: US 7,443,313 B2
(45) Date of Patent: Oct. 28, 2008

(54) WATER UTILITY METER TRANSCEIVER

(75) Inventors: James S. Davis, Woodstock, GA (US); David L. Heitert, Buford, GA (US)

(73) Assignee: Hunt Technologies, Inc., Pequot Lakes, MN (US)

( * ) Notice: Subject to any disclaimer, the term of this patent is extended or adjusted under 35 U.S.C. 154(b) by 298 days.

(21) Appl. No.: 11/072,357

(22) Filed: Mar. 4, 2005

(65) Prior Publication Data

US 2006/0202853 A1 Sep. 14, 2006

(51) Int. Cl.
*G08B 23/00* (2006.01)
(52) U.S. Cl. .............................. 340/870.02; 340/870.01; 340/870.07; 340/870.2; 340/539.26; 73/201
(58) Field of Classification Search ............ 340/870.02, 340/870.01, 870.07, 870.2, 401, 539.26; 137/870.4, 15.03, 296; 73/201; 324/156
See application file for complete search history.

(56) References Cited

U.S. PATENT DOCUMENTS

| | | | | |
|---|---|---|---|---|
| 6,954,144 B1 * | 10/2005 | Kiser et al. | ............ | 340/539.26 |
| 7,061,924 B1 * | 6/2006 | Durrant et al. | .............. | 370/401 |
| 2004/0129312 A1 * | 7/2004 | Cuzzo et al. | ................ | 137/296 |
| 2005/0122094 A1 * | 6/2005 | Robinson | .................... | 324/156 |

\* cited by examiner

*Primary Examiner*—Albert K. Wong
*Assistant Examiner*—Sisay Yacob
(74) *Attorney, Agent, or Firm*—Thomas, Kayden, Horstemeyer & Risley LLP

(57) ABSTRACT

A water meter transceiver coupled to a water meter has a head portion that houses a processor having a transceiver. The transceiver transmits water utility consumption data received from the water meter. A stem is coupled to the head portion and has a hollowed portion for containing a power source that is coupled to the processor. The stem may include threads to receive a nut that positions the head portion to a lid of a water meter container. The stem may include a switch that is coupled to the processor and configured to activate when the nut is coupled to the stem. If the nut is removed without authorization, the switch reports such, thereby causing the processor to execute a predetermined action, such as communicating an alert or disabling the water meter so as to prevent theft of the water utility.

21 Claims, 9 Drawing Sheets

WATER UTILITY METER TRANSCEIVER

TECHNICAL FIELD

This disclosure generally relates to automated meter reading systems, and more particularly to systems and methods for wirelessly communicating utility consumption and related information.

BACKGROUND

Utility companies have historically provided individual water consumption meters for individual utility service lines that include a gauge for water utility personnel to manually inspect. In such systems, water utility personnel periodically travel throughout the distribution network and manually inspect each water meter gauge to determine the amount of utility consumption since the previous reading. In large utility distribution networks, a greater number of water utility personnel are utilized for manual meter reading, thereby resulting in substantial lag times between the readings of an individual meter within a prescribed period of time.

More recently, the advent of wireless communication networks has enabled the reading of electronic water meters and the subsequent communication of consumption data. As a nonlimiting example, water distribution networks have retrofitted their various commercial and residential water meters to include wireless transmitters that wirelessly communicate consumption and other related data to water utility personnel who may travel on foot or by automobile within the transmission range of such devices. In this nonlimiting example, the water utility personnel can collect data more quickly and less intrusively, thereby speeding the data collection process and reducing the costs sustained by the water utility.

As another nonlimiting example, wireless transmitters coupled to the commercial and residential water meters may also be configured to wirelessly communicate consumption and other related data to other transmitting meters or repeaters such that the usage data is repeated or daisy-chained through a series of other electronic devices to a central office. This scheme completely obviates the need for water utility personnel to travel throughout the distribution network to read the meters. In this nonlimiting example, a wireless transmitter at a particular commercial residence may communicate the consumption information for that residence to another meter or repeating device that subsequently communicates information over a wide area network, such as the Internet, to the central office. Although the initial cost due to the electronics and installation costs may be greater for such devices, the long term application costs are typically substantially less than the costs associated with traveling water utility personnel, as described above.

Nevertheless, these later schemes which employ wireless transmitters to communication consumption and other related information, are also plagued by various problems. For example, most water meters are buried beneath the ground such that placement of a transmitter within the hole location of the water meter reduces the transmitting capability and range. With the reduced transmission range, it may be difficult in particular instances to place another transmitter or repeating device within broadcast range. Likewise, the reduced transmission range may make it difficult for water meter personnel to drive within the broadcast range of the meter when collecting consumption data.

Plus, installing such devices at ground level so that the transmitting portion of the meter transceiver is capable of transmitting subjects the device to environmental and other hazards. More specifically, such devices are vulnerable to rain, snow and ice, as well as other hazards like a lawnmower that may travel over the water meter's position. If the above-ground portion of such a meter configuration does not have a sufficiently low profile, it may be damaged when, as a nonlimiting example, a lawnmower travels over the meter's location such that the blade or other part of the lawnmower damages and even destroys the meter.

Other problems with wireless transmitters for water meters include the possibility of tampering with the device by the consumer, thereby resulting in the unauthorized access to and/or disablement of the meter. Since the transmitter portions of such devices are typically positioned with some degree of exposure, as described above, such devices may be susceptible to tampering by the consumer so as to cause the device not to transmit consumption information, thereby resulting in the consumer not being charged for the consumption of the water utility.

As an additional nonlimiting example, because such devices are typically battery operated, some residential consumers may attempt to open or gain access to the transmitters to remove the battery to disable transmitting functions. Removing the battery may not affect water flow through the meter itself, but may result in no transmission of consumption, which constitutes theft of water.

Therefore, a heretofore unaddressed need exists to address the aforementioned deficiencies and shortcomings described above.

DESCRIPTION OF THE DRAWINGS

Many aspects of this disclosure can be better understood with reference to the following drawings. The components in the drawings are not necessarily to scale, emphasis instead being placed upon clearly illustrating the principals disclosed herein. Moreover, in the drawings, like reference numerals designate corresponding parts throughout the several views.

DETAILED DESCRIPTION

In addition to the drawings discussed above, this description describes one or more embodiments as illustrated in the above-referenced drawings. However, there is no intent to limit this disclosure to a single embodiment or embodiments that are disclosed herein. On the contrary, the intent is to cover all alternatives, modifications, and equivalents included within the spirit and scope of this disclosure and as defined by the appended claims.

A water meter transceiver coupled to a water meter has a head portion that houses a processor electrically coupled to a transceiver. The transceiver transmits water utility consumption data received from the water meter. A stem section is coupled to the head portion and has a hollowed portion for containing a power source that is electrically coupled to the processor. The stem section may include threads to receive a nut. Coupling the nut to the stem section positions the head portion to a lid of a water meter container. The stem section includes a switch that is electrically coupled to the processor and configured to depress when the nut is coupled to the stem section. If the nut is removed without authorization, the switch reports such, thereby causing the processor to execute a predetermined action, such as communicating an alert or disabling the water meter so as to prevent theft of the water utility.

Figure 1:
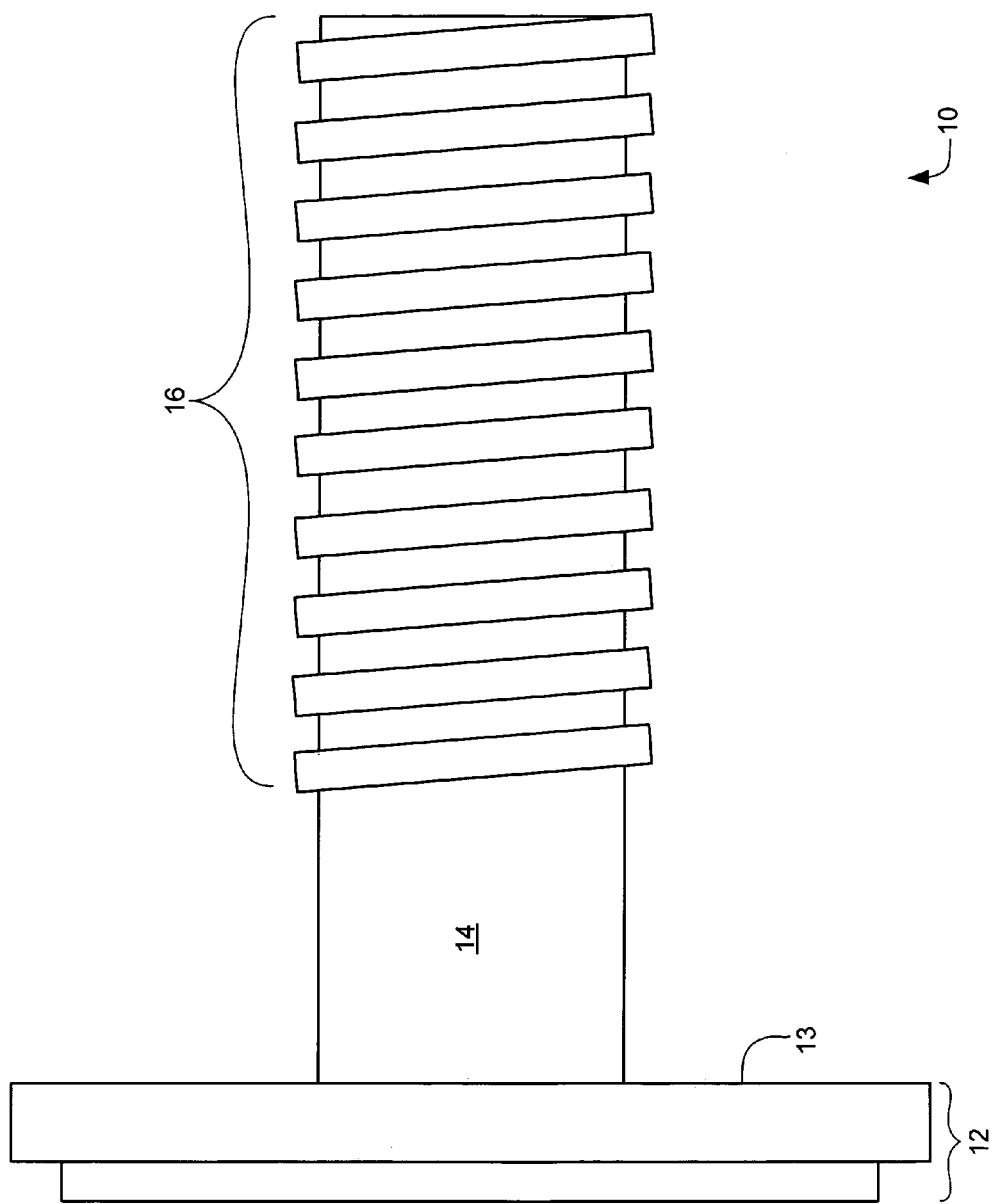
FIG. 1 is a diagram of the water meter transmitter housing that may be used for receiving water consumption data and transmitting such data wirelessly to a transceiver.
Figure 5:
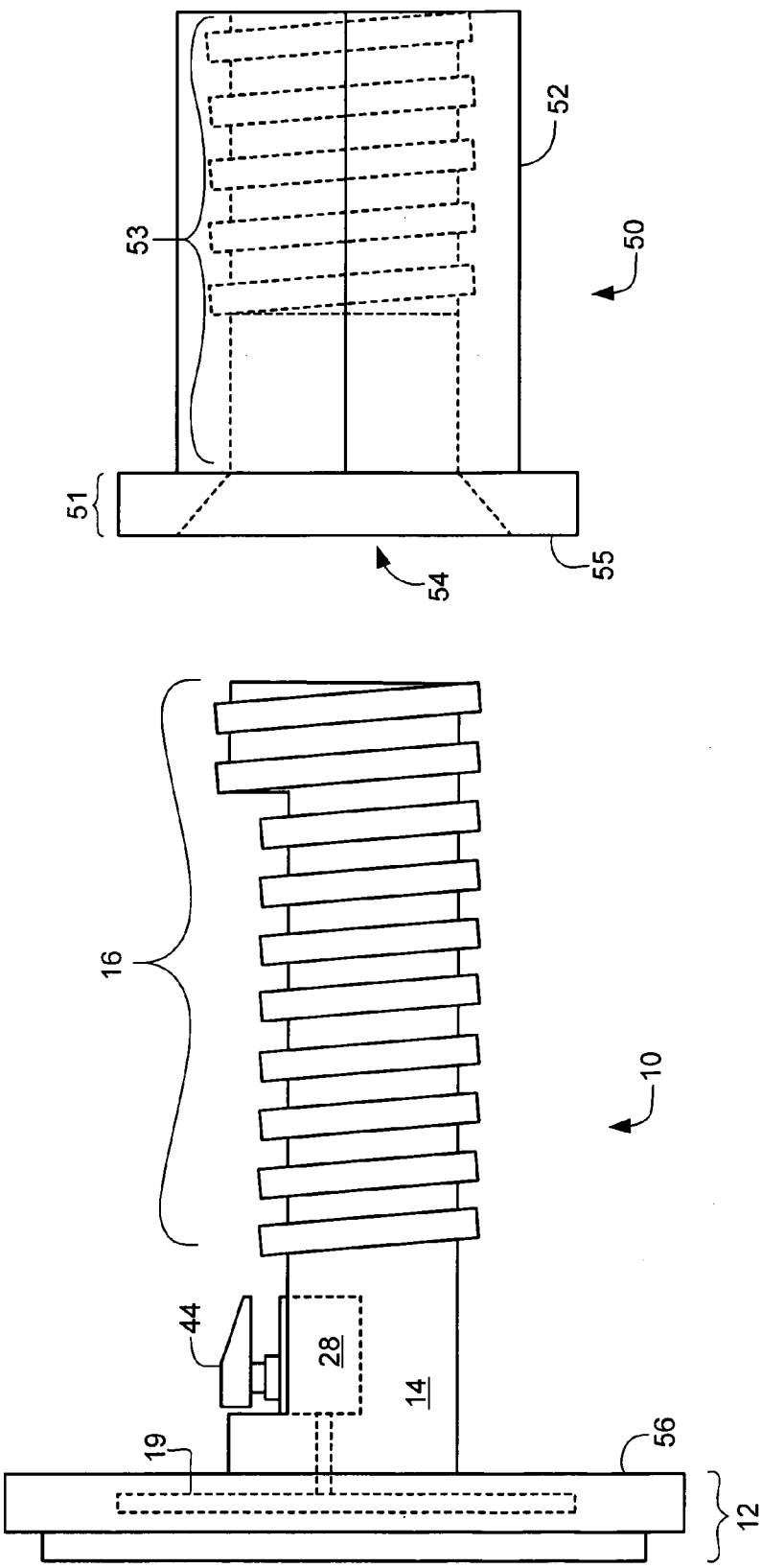
FIG. 5 is a diagram of the wireless transmitter housing of FIG. 1 and associated nut.
Figure 9:
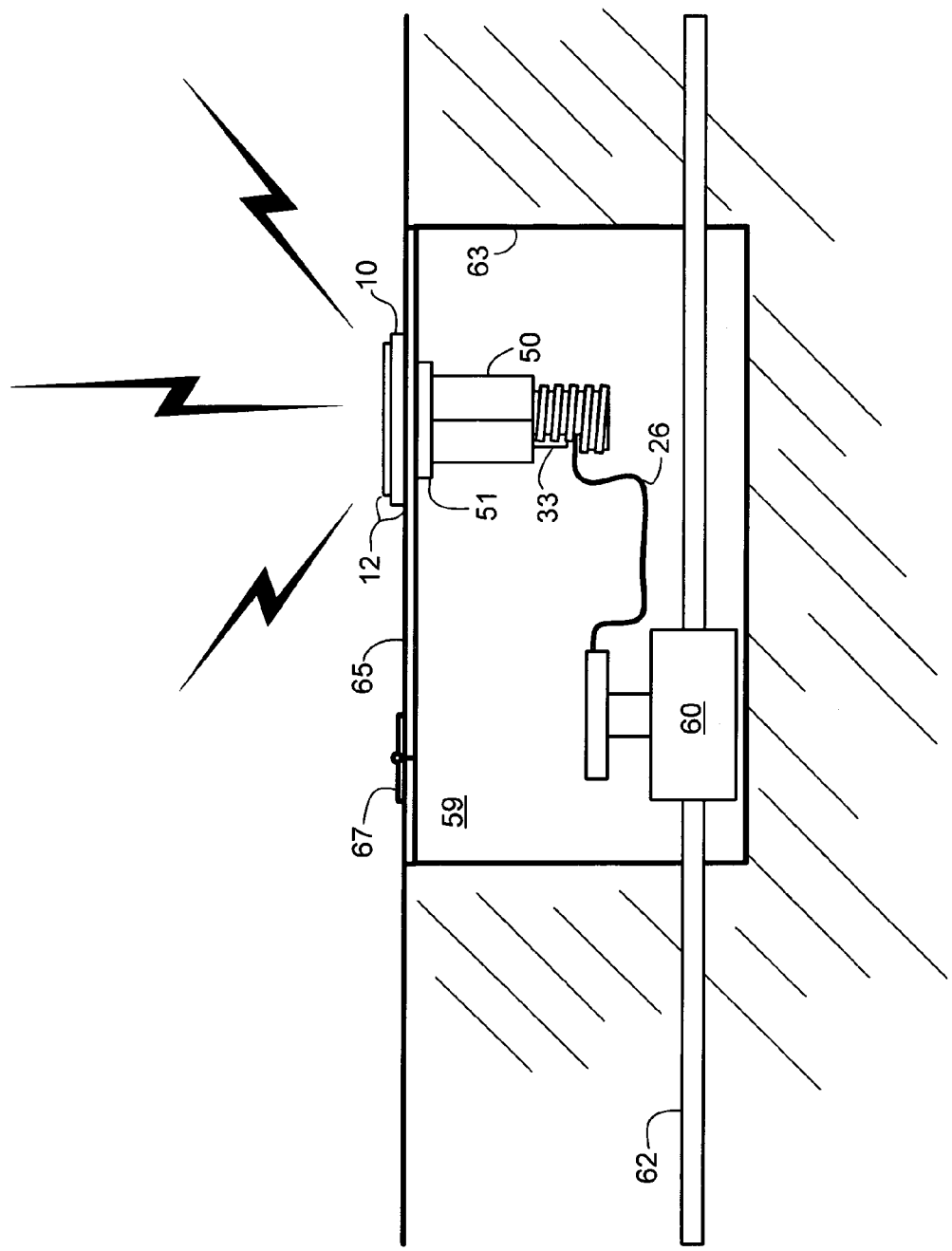
FIG. 9 is a diagram of water meter transmitter of FIG. 1 and nut of FIG. 5 shown positioned in a water meter container.

FIG. 1 is a diagram of the water meter transmitter housing 10 that may be used for receiving water consumption data and transmitting such data wirelessly to a transceiver. The water meter transmitter 10 is comprised of a head portion 12 and stem portion 14. As described and shown below, the electronics of the transmitter may be placed within head portion 12, which, as also shown below, may be positioned at or near ground level if, for example, the transmitter 10 is mounted in an enclosure (see FIG. 9). The head portion is configured with a sufficiently low profile so to not create an obstacle to lawnmowers and other devices that may travel across the transmitter's position. More specifically, surface 13 of head portion 12 may be positioned against a top portion of a water meter lid or other top surface with stem portion 14 extending into the internal area of the water meter hole or other pit (see FIG. 9). As described in more detail below, stem 14 contains hollowed portions for housing a battery and other electronics to prevent tampering and/or disabling of the transmitter in the housing 10. Stem portion 14 also includes one or more threads 16 for receipt of a locking nut, as shown in FIG. 5, that secures the housing 10 to the water meter lid, as shown in FIG. 9.

Figure 2:
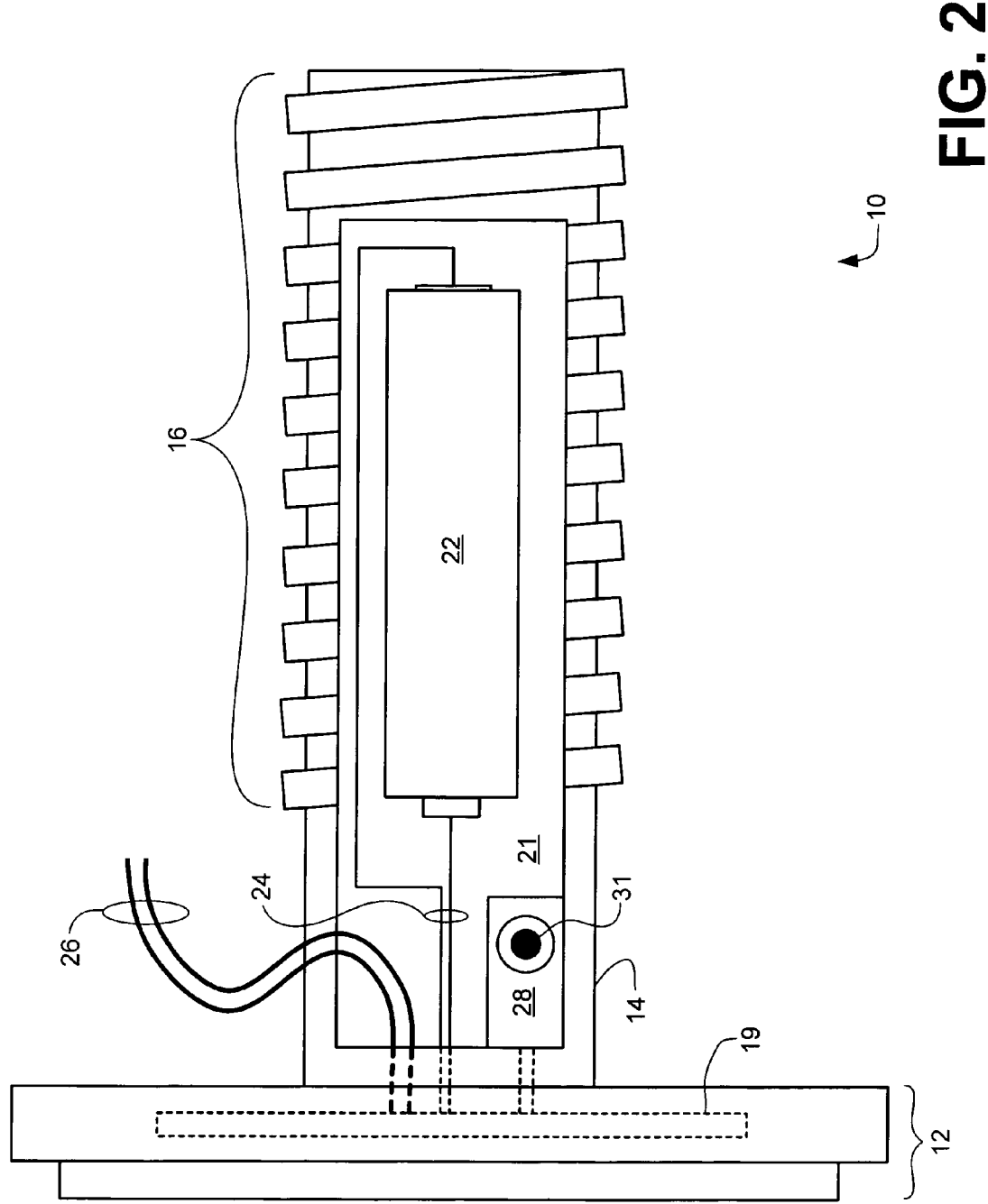
FIG. 2 is a diagram of the wireless water meter transmitter of FIG. 1 depicting an open section in the stem for housing the battery and anti-theft components.

FIG. 2 is a diagram of the wireless water meter transmitter 10 of FIG. 1 depicting an open section 21 in stem portion 14 for housing a battery 22 and anti-theft components. In this nonlimiting example, processing electronics 19 are shown positioned within the head portion 12 of the wireless transmitter 10. As stated above, this portion of the wireless transmitter 10 is displaced above ground, preferably immediately above a water meter container lid, that is, in at least one nonlimiting example.

Processing electronics 19 include a wireless transmitter/receiver, thereby enabling the transmission and receipt of wireless communications. The processing electronics 19 are powered by battery 22, which is positioned within the stem portion 14, as shown in FIG. 2. More specifically, stem portion 14 includes hollow section 21 that is configured for receiving battery 22 that is electrically coupled to processing electronics 19 via path 24. As stated above, stem portion 14 extends through the lid of the water meter container, thereby protecting the battery from weather or other elements that may exist at ground level.

Processing electronics 19 also is electrically coupled to the actual water meter 60 (FIG. 9) via connector 26. As discussed in more detail below, water meter 60 communicates electrically via connector 26 with processing electronics 19 to communicate utility consumption data and other related information to the processing electronics 19 for the subsequent wireless transmission of such data and information.

As indicated above, if a water meter container lid is not locked or otherwise secured, the water meter transmitter 10 may be susceptible to vandalism or disablement if a consumer can gain access to battery 22 and/or the connection path 26 between processing electronics 19 and water meter 60. Thus, switch 28 is included in open cavity 21 and is configured to activate, and/or deactivate, the processing electronics 19 and/or take other predetermined action if the switch is tripped. Switch 28 includes button 31 that may be depressed via nut 50 in FIG. 5, which is coupled to stem portion 14 during normal operation. As discussed in more detail below, if a residential consumer attempts to gain access to water meter transmitter 10 by removing nut 50, as disclosed below, switch 28 may detect the removal of nut 50, thereby deactivating the transmitter in processing electronics 19. As an additional nonlimiting example, the activation of switch 28 may cause an alert to be transmitted from the processing electronics 19 that may be received by the water meter utility control office indicating that unauthorized access has occurred in regard to the water meter transmitter 10. In each case, switch 28 is electrically coupled to processing electronics 19, which is configured as one who is skilled in the art would know via hardware and related software for detecting access that is deemed to be unauthorized.

Figure 3:
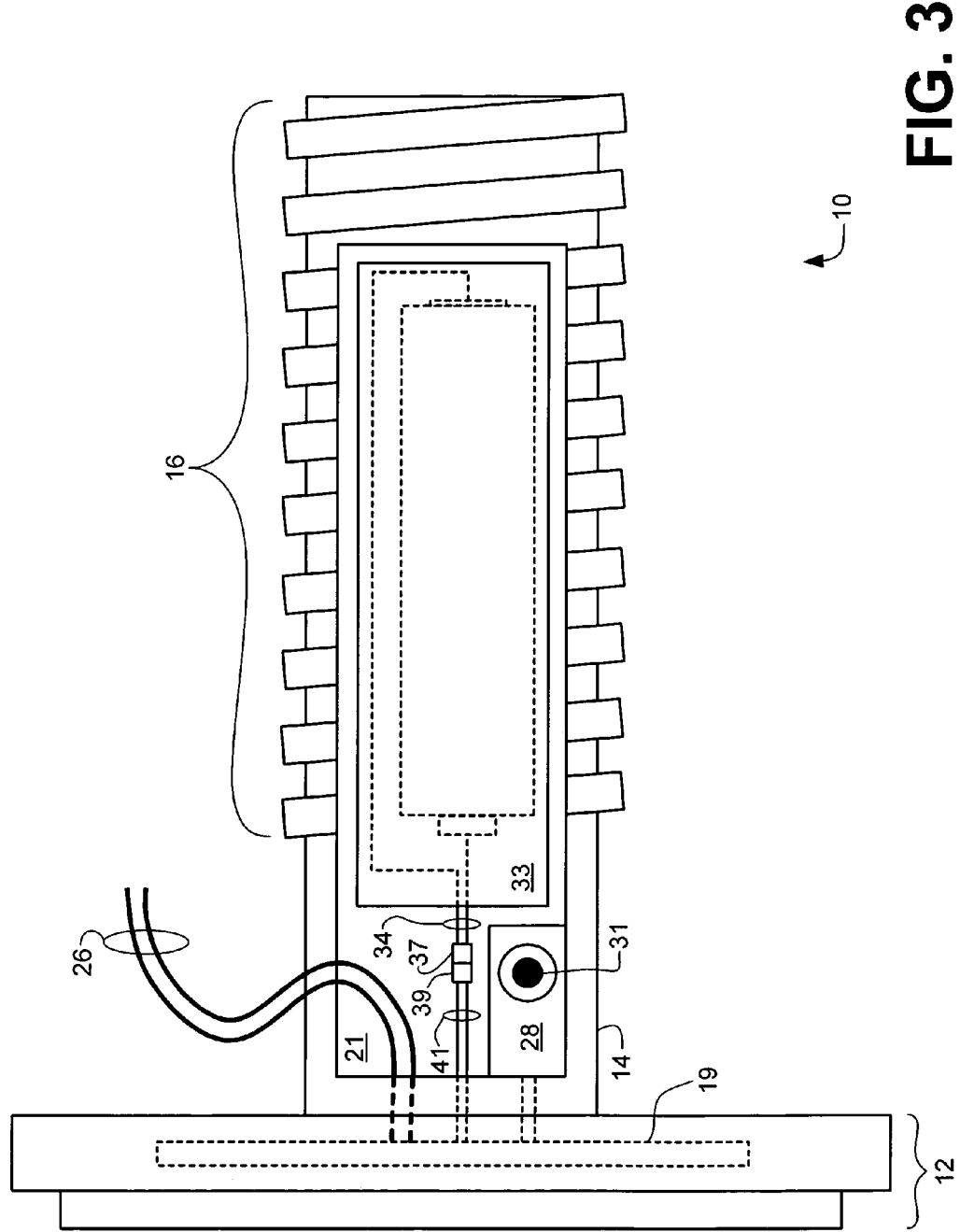
FIG. 3 is a diagram of the transmitter housing of FIG. 1 depicting an encased battery module.

FIG. 3 is a diagram of the transmitter 10 depicting battery module 33 that is fully encapsulated so as to protect the battery 22 from the environment within the water meter container. More specifically, the battery module 33 includes battery 22, which is electrically connected by wire path 34 and connector 37 to connector 39 and wire path 41 to processing electronics 19. In this way, water meter personnel may more quickly replace the battery module 33 when it is exhausted with a new battery module 33 by simply detaching connectors 37 and 39 and reattaching connector 39 to a new connector 37 that is electrically coupled to a new battery 22 and module 33. By encapsulating battery 22 within module 33, water meter personnel do not have to otherwise ensure a proper connection between battery 22 and processing electronics 19, since the connectors are so configured as one of ordinary skill in the art would know. One skilled in the art would also know of one or more battery types that could be utilized in water meter transmitter 10 in addition to the nonlimiting example shown in FIGS. 2 and 3.

Additionally, multiple batteries may be placed in series as opposed to a single battery (multiple batteries not shown), as shown in the nonlimiting examples of FIGS. 2 and 3. In any case, however, battery 22 is configured to power processing electronics 19 for receiving and transmitting wireless communications for a desired amount of time so as to minimize water meter personnel having to replace the battery 22 in the water meter transmitters 10 in a large water distribution network.

Figure 4:
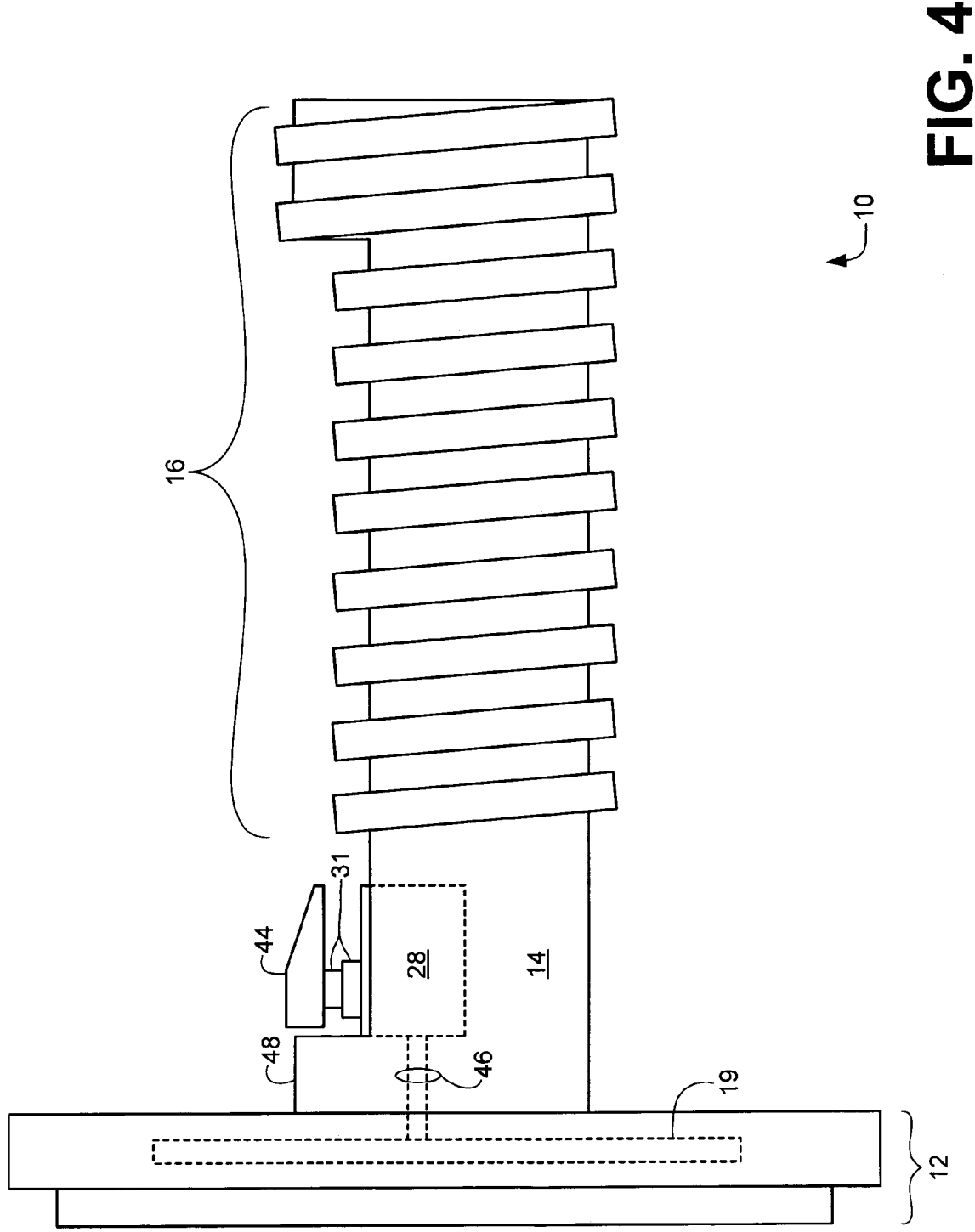
FIG. 4 is a side view of the water meter transmitter of FIGS. 1-3.

FIG. 4 is a side view of the water meter transmitter 10 of FIGS. 1-3 depicting switch 28 and its anti-vandalism/disablement characteristics. Switch 28 is electrically coupled to processing electronics 19 via wired path 46. Button 31, as shown in FIG. 3, is positioned between switch 28 and head 44, which is shown angled so as to activate when nut 50 (FIG. 5) is coupled via threads 16. As discussed in more detail below, as nut 50 (FIG. 5) moves laterally across stem portion 14 via threads 16, nut 50 comes into contact with the slanted portion of head 44 (in this nonlimiting example) so as to cause head 44 to depress, thereby activating switch 28. In this nonlimiting example, as shown in FIG. 4, button 31 and head 44 are shown in an extended position such that the outer surface of head 44 extends beyond the edge 48 of stem portion 14. But when nut 50 is moved up threads 16 so as to depress head 44 and button 31, head 44 moves to a position that is within the outer surface 48 of stem 14, thereby, activating switch 28.

The inclusion of switch 28 in water meter transmitter 10 enables processing electronics 19 to be configured to protect against vandalism or disablement. As a nonlimiting example, if a residential consumer attempts to remove nut 50, as discussed below, switch 28 will detect the removal of nut 50 as button 31 and head 44 are extended to their outmost position, as shown in FIG. 4. Processing electronics 19 thereafter receives indication of this change in state of switch 28 and recognizes this as a breach of the meter. One skilled in the art would know that water meter personnel may be able to provide a security code via a wireless transmitter or similar device to processing electronics 19 so as to disable any security functions that may thereafter be programmed to execute, such as the wireless transmission of an alert to the central office reporting the breach to water meter transmitter 10 or the otherwise disablement of water meter 60 via connector 26. Each action, as well as any other that one of ordinary skill in the art would know, could operate to prevent theft of the water utility. In any case, switch 28 maybe configured so as to authorize water meter personnel and no others for gaining access to water meter transmitter 10. Other types of switches could include optocouplers and using the nut and housing as make-or-break terminals.

FIG. 5 is a diagram of the water meter transmitter 10 and nut 50. In this nonlimiting example, nut 50 is comprised of a first portion 51 having facing 55. Facing 55 is configured so as to fasten or contact against the underside of a water meter container lid that may be displaced between facing 55 and surface 56, which is the bottom portion of head portion 12. Nut 50 also includes body portion 52, which is configured with a hollow portion 54 and female threads 53 for receipt of male threads 16 and stem portion 14. As described above, nut 50 may be placed via its opening 54 on threads 16 and threaded such that nut 50 moves laterally toward head portion 12. As also discussed above, as nut 50 moves toward head portion 12, the inner surface of the opening 54 causes switch head 44 to depress such that switch 28 communicates the receipt of nut 50 to processing electronics 90, thereby activating water meter transmitter 10 for service in one nonlimiting example.

Figure 6:
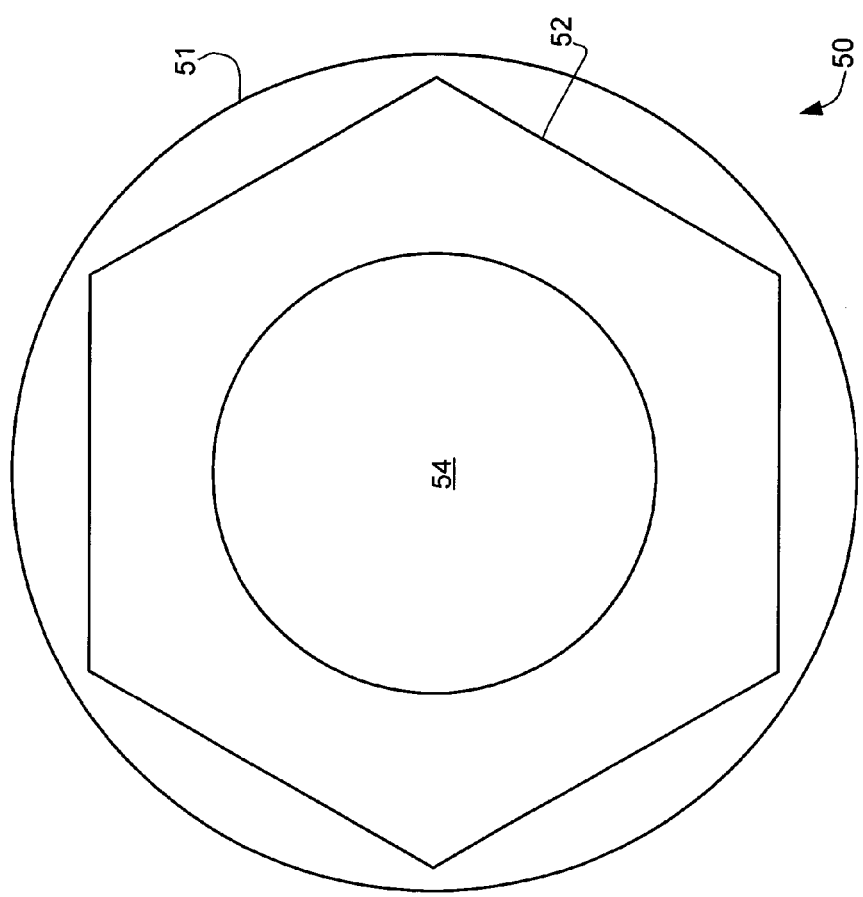
FIG. 6 is an end view diagram of the nut of FIG. 5 depicting the hexagonal flat sections and rounded end.

FIG. 6 is an end diagram view of nut 50 depicting the hexagonal flat sections 52 and rounded end 51, as also shown in FIG. 5. Nut 50 also in this diagram depicts the opening 54 which is configured to receive the stem portion 14 as nut 50 is threaded onto threads 16 of the water meter transmitter 10.

It should be understood that the water meter transmitter 10 and nut 50 are not configured to be any preset size. Various models and sizes may be configured according to these general diagrams, as one of ordinary skill in the art would know.

Figure 7:
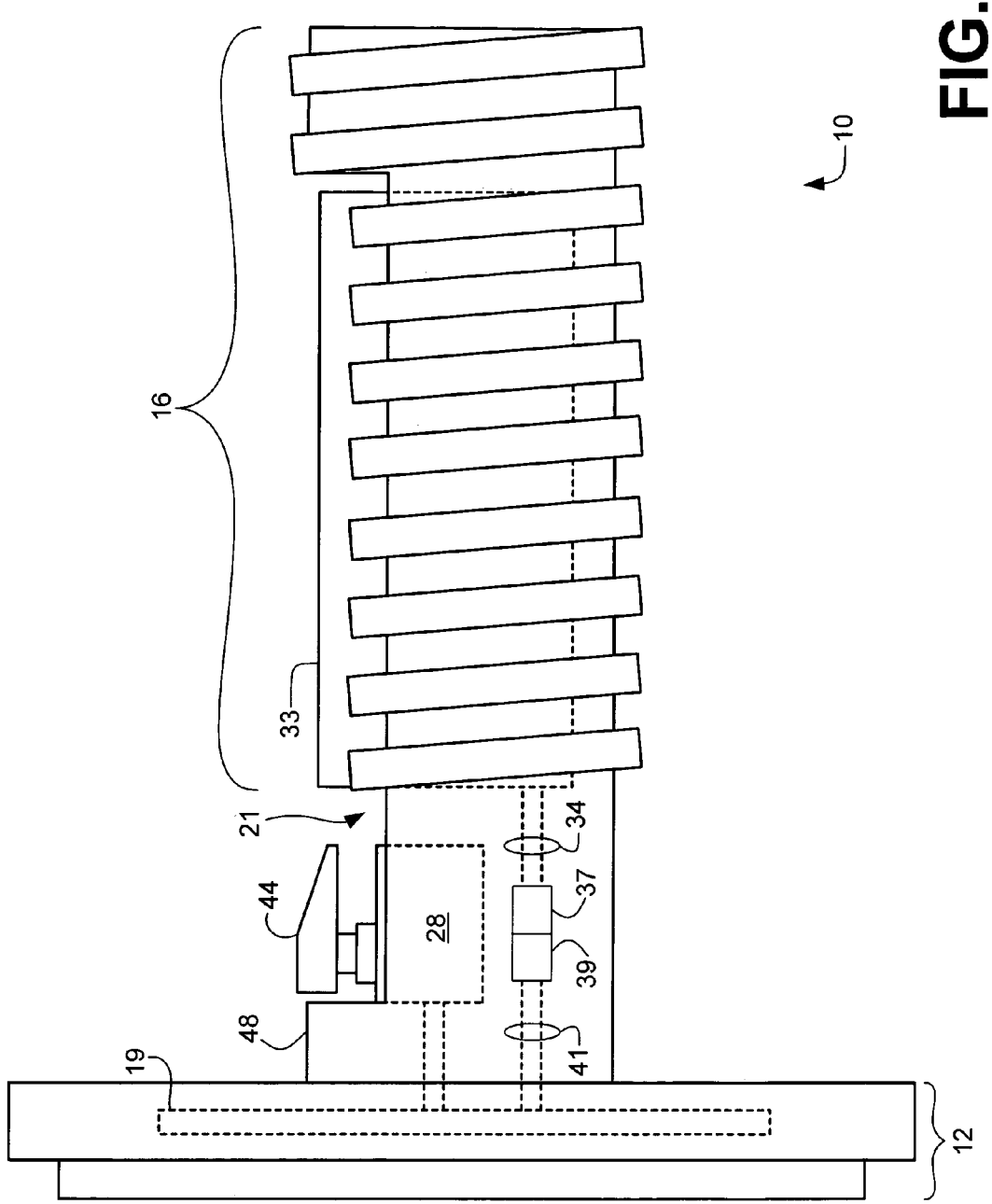
FIG. 7 is a diagram of the wireless transmitter of FIG. 1 with a battery module positioned within a hollowed portion.

FIG. 7 is a diagram of the water meter transmitter 10 with a battery module 33 positioned within the hollowed portion 21. In this nonlimiting example, battery module 33 is sized so as to position within hollow section 21 and not extend beyond the outer surface 48 on stem portion 14. Accordingly, stem portion 14 may receive nut 50 in FIG. 6 via threads 16, which causes nut 50 to move laterally over and around stem portion 14, including battery module 33. As also described above, battery module 33 may be electrically coupled to processing electronics 19 via at least wired path 34, connectors 37 and 39, and wired path 41.

One of ordinary skill in the art would know based on FIG. 7 and the other figures of this disclosure that the water meter transmitter 10 may be configured of any material sufficient to accomplish the features described herein. As a nonlimiting example, water meter transmitter 10 may be constructed of various plastics and other similar materials so that hollow section 21 may be created while still offering adequate structural strength and durability.

Additionally, one of ordinary skill would know that nut 50 could be configured to couple to stem section 14 in methods other than the threads 16. As nonlimiting examples, nut 50 and stem section 14 may be coupled according to matching fasteners (such as a BNC connection type), locks, tensioned placement holders, clips, o-rings, etc.

Figure 8:
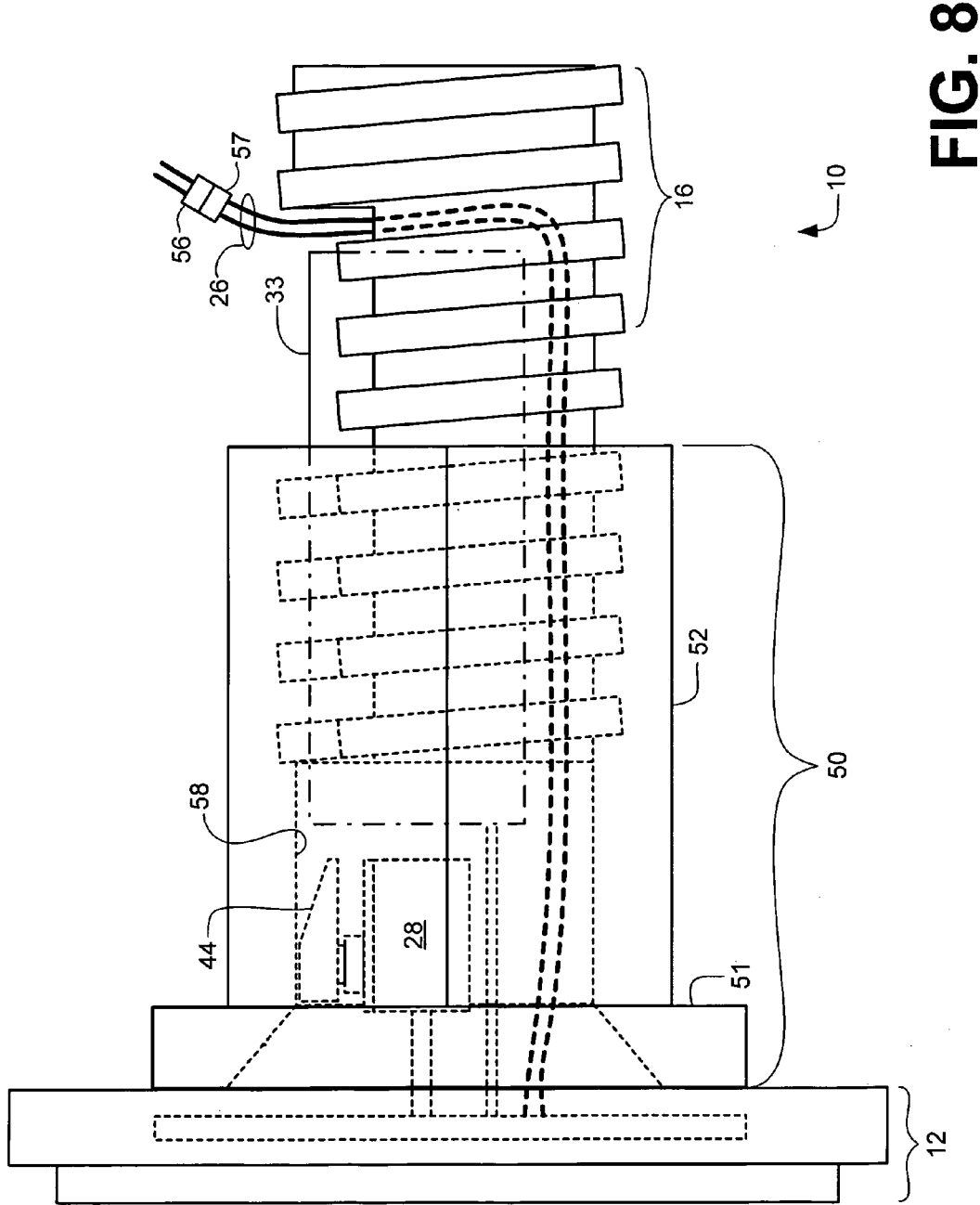
FIG. 8 is a diagram of the wireless transmitter housing of FIG. 1 with nut of FIG. 5 attached thereto.

FIG. 8 is a diagram of the water meter transmitter 10 of FIG. 1 with nut 50 of FIG. 5 attached thereto. In this nonlimiting example, nut 50 is threaded completely against head 12 of the wireless transmitter 10, even though one of ordinary skill in the art would know that a water meter container lid would otherwise be displaced between section 51 of nut 50 and the bottom surface of head portion 12, as described above. Nevertheless, as nut 50 is threaded onto the stem 14 of wireless transmitter housing 10, switch head 44 is shown in a depressed position, as the inner surface 58 of nut 50 contacts switch head 44.

In this nonlimiting example, switch 28 thereafter may be configured to communicate the contact of nut 50 so that the transmitter on processing electronics 19 may communicate wirelessly with the central office or with some other wireless communicating device in the water distribution network. If unauthorized personnel attempt to remove nut 50, switch head 44 may be extended into its outer position such that switch 28 reports this change of state, thereby signifying an unauthorized access to the water meter transmitter 10 and nut 50. If water meter personnel desire to gain access to the meter, the water meter personnel may be equipped with an electronic transmitter so as to access the security functions of the water meter transmitter 10 so that water meter personnel may conduct maintenance or other operations as desired.

Also, in this nonlimiting example of FIG. 8, connector 26 is shown extending through stem portion 14 and out through the lower portion of the stem; however, one of ordinary skill in the art would know that connector 26 may be routed between processing electronics 19 and water meter 60 in one or more various configurations. This nonlimiting example merely depicts that connector 26 passes through stem portion 14 below the point where nut 50 travels laterally along stem portion 14. Couplers 56, 57 may enable connection of connector 26 to water meter 60 (FIG. 9) after nut 50 is threaded on stem portion 14.

FIG. 9 is a diagram of water meter transmitter 10 and nut 50 of FIG. 5 shown positioned in a water meter container 59. In this nonlimiting example, water meter 60 is designed to measure water flow through pipe 62. This flow information is electrically communicated to processing electronics 19 (not shown) and head portion 12 of water meter transmitter 10 via connector 26.

Nut 50 is shown threaded against lid 65 of water meter container 59 such that lid 65 is displaced between top portion 51 of nut 50 and head portion 12 in a secured fashion, as one of ordinary skill in the art would know.

In this nonlimiting example, lid 65 may be hinged via hinge 67 so that water meter personnel can gain access to the interior portion compartment of water meter container 59, which has walled portion 63. Nevertheless, during normal operations, consumption data that is communicated via connector 26 is wirelessly transmitted, as shown in FIG. 9. These wireless transmissions may be communicated to other water meter transmitters 10 within the water distribution network. However, as also described above, water meter personnel may travel within the water distribution network with receivers that may come within range of the water meter transmitter 10 in FIG. 9 so as to receive water utility consumption information. The water meter transmitter 10 as shown in FIG. 9 provides a low profile system wherein the transmitter is actually above ground while the battery compartment is below ground in stem portion 14 within the water meter container 59.

As an alternative embodiment and nonlimiting example, instead of head portion 12 being positioned on the top surface of the lid, the head portion 12 may also be mounted within water meter container 59 so that it is completely encased in the container 59. The container 59 may include a flange (not shown) that permits the head portion 12 to couple to one side and the nut 50 to couple to the other, that is, when nut 50 is also coupled to stem section 14. Thus, the configurations described above are merely nonlimiting examples, as the water meter transmitter may be positioned below ground level.

It should be emphasized that the above-described embodiments and nonlimiting examples are merely possible examples of implementations, merely set forth for a clear understanding of the principles disclosed herein. Many variations and modifications may be made to the above-described embodiment(s) and nonlimiting examples without departing substantially from the spirit and principles disclosed herein. All such modifications and variations are intended to be included herein within the scope of this disclosure and protected by the following claims.

We claim:

1. A water meter transceiver coupled to a water meter, comprising:
   a relatively low profile head portion configured to house a processor having a transceiver configured to transmit water utility consumption data received from the water meter and configured to receive wireless communications from other transmitting devices;
   a stem section coupled to the head portion, the stem section having a hollowed portion configured to contain a power source that is coupled to the processor, the stem section having threads on a portion of the outer surface of the stem section;
   a nut configured to couple to the stem section according to the threads on the stem section and threads on a portion of the nut; and
   a switch positioned in the stem section and coupled to the processor, the switch configured to activate when the nut is coupled to the stem section.

2. The transceiver of claim 1, wherein the stem section extends through a water meter container lid so that the head portion remains above ground and the stem section extends into the water meter container interior.

3. The transceiver of claim 1, wherein the head portion is coupleable to an outer surface of a water meter container such that the stem section extends through an opening in the outer surface and the nut is coupleable to an inner surface of the water meter container when coupled to the stem section extending within the water meter container.

4. The transceiver of claim 1, further comprising:
   logic in the processor configured to wirelessly communicate an alert message when the nut is moved on the stem section sufficiently to allow the switch to change state.

5. The transceiver of claim 1, further comprising:
   logic in the processor configured to wirelessly communicate an alert message when the nut is moved on the stem section sufficiently to allow the switch to change state if an authorized access instruction is not received by the processor within a predetermined time before or after the switch changes state.

6. The transceiver of claim 1, further comprising:
   logic in the processor configured to disable water flow through the water meter when the nut is moved on the stem section sufficiently to allow the switch to change from an activated state to a deactivated state.

7. The transceiver of claim 1, further comprising:
   logic in the processor configured to disable water flow through the water meter when the nut is moved on the stem section sufficiently to allow the switch to change from an activated state to a deactivated state if an authorized access instruction is not received by the processor within a predetermined time before or after the switch changes state.

8. The transceiver of claim 1, wherein the power source is a battery encapsulated in a sealed module, the battery being electrically coupled to the processor.

9. The transceiver of claim 1, wherein at least a portion of the hollow section of the stem section is exposed when the nut is fully threaded on the stem.

10. The transceiver of claim 1, wherein the processor activates the transceiver to retransmit messages received from other transceivers, the messages containing water utility consumption data for another water meter.

11. The transceiver of claim 1, wherein the stem section extends through a member inside a container so that the nut couples to one surface of the member and the head portion couples to a second surface of the member, wherein the transceiver is below ground.

12. A method for wirelessly transmitting water utility consumption information, comprising the steps of:
   powering a processor with a power source, the processor electrically coupled to a transceiver and configured in a head section of a housing device, the power source configured in a stem section of the housing device, the stem section coupled to the head section and configured to receive a securing device that positions the head section in a predetermined position above ground level and at least a portion of the stem section below ground level;
   receiving data from a water meter corresponding to water utility consumption; and
   transmitting the data received from the water meter with the transceiver in the head section if a switch in the stem section that is electrically coupled to the processor and in physical communication with the securing device is in a predetermined state.

13. The method of claim 12, further comprising the step of:
   transmitting an alert signal if the securing device is removed from physical communication with the switch and no authorization instruction is received by the processor within a predetermined time before or after the securing device is removed from physical communication with the switch.

14. The method of claim 12, further comprising the step of:
   outputting an instruction directing the termination of water flow through the water meter if the securing device is removed from physical communication with the switch and no authorization instruction is received by the processor within a predetermined time before or after the securing device is removed from physical communication with the switch.

15. The method of claim 12, wherein the head section is configured with a low profile relative to the ground level.

16. The method of claim 12, wherein the securing device attaches to the stem section according to threads on the stem section and the securing device.

17. The method of claim 12, wherein the securing device attaches to the stem section according to an adjustable locking relationship between the stem section and the securing device.

18. The method of claim 12, wherein the securing device attaches to the stem section according to an adjustable tension device that holds the securing device in a position relative to the stem section.

19. The method of claim 12, wherein a portion of the securing device is positioned against an inner surface of a lid and a portion of the head section is positioned against an outer surface of the lid.

20. A system for communicating water utility consumption, comprising:

- a top section configured to house processing electronics and a transceiver, the transceiver configured to wirelessly transmit messages received from the processing electronics and to wirelessly retransmit messages received from other transceivers;
- a stem section coupled to the top section having a power source compartment and a switch for detection of the presence of a securing device coupled to the stem section, the securing device configured to position a material between the top section and the securing device; and
- a passage for the routing of a communication path between the processing electronics and the water meter.

21. The system of claim 20, wherein the switch communicates the detection of the removal of the securing device to the processing electronics, the processing electronics configured to implement a predetermined action in response to said communication from the switch.

* * * * *